United States Patent
Kawahigashi

(12)
(10) Patent No.: US 6,863,340 B2
(45) Date of Patent: Mar. 8, 2005

(54) INSTRUMENT PANEL-AIR CONDITIONING DUCT ASSEMBLY FOR VEHICLE

(75) Inventor: Toshiro Kawahigashi, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/416,123

(22) PCT Filed: Nov. 12, 2001

(86) PCT No.: PCT/JP01/09866

§ 371 (c)(1),
(2), (4) Date: Jan. 2, 2004

(87) PCT Pub. No.: WO02/38411

PCT Pub. Date: May 16, 2002

(65) Prior Publication Data

US 2004/0102152 A1 May 27, 2004

(30) Foreign Application Priority Data

Nov. 10, 2000 (JP) ........................................ 2000-342930

(51) Int. Cl.[7] .............................................. B62D 25/14
(52) U.S. Cl. ........................ 296/208; 180/90; 454/127
(58) Field of Search ................................ 454/121, 127, 454/152; 296/208, 901; 180/90

(56) References Cited

U.S. PATENT DOCUMENTS 5,762,395 A * 6/1998 Merrifield et al. ..... 296/203.01
5,934,744 A * 8/1999 Jergens et al. ............... 296/192
6,110,037 A   8/2000 Yoshinaka ..................... 29/208
6,155,631 A  12/2000 Yoshinaka et al. .......... 296/188
6,582,005 B2 * 6/2003 Takano ......................... 296/70
2003/0193217 A1 * 10/2003 Hesch .......................... 296/208

FOREIGN PATENT DOCUMENTS

| JP | 01058527 A | * | 3/1989 | .......... B29C/65/08 |
| JP | 09-267623  |   | 10/1997 | |
| JP | 11-165563  |   | 6/1999 | |
| JP | 11-198681  |   | 7/1999 | |
| JP | 2000-264094 |  | 9/2000 | |

* cited by examiner

Primary Examiner—Harold Joyce
(74) Attorney, Agent, or Firm—Standley Law Group LLP

(57) ABSTRACT

An instrument panel (2) includes a surface-side molded panel member (3) made of a synthetic resin and a back-side molded panel member (4) made of a synthetic resin. The back-side molded panel member (4) is vibration-welded to the surface-side molded panel member (3) through a plurality of projections (5) existing on its surface opposed to the surface-side molded panel member (3), and a heat-insulating gap (6) is left between both of the molded panel members (3, 4). An air-conditioning duct (10) is formed using a portion (22) of the back-side molded panel member (4) as a portion of its peripheral wall. Thus, it is possible to provide an instrument panel-air conditioning duct assembly (1) for a vehicle, which is produced at a reduced number of steps.

20 Claims, 3 Drawing Sheets

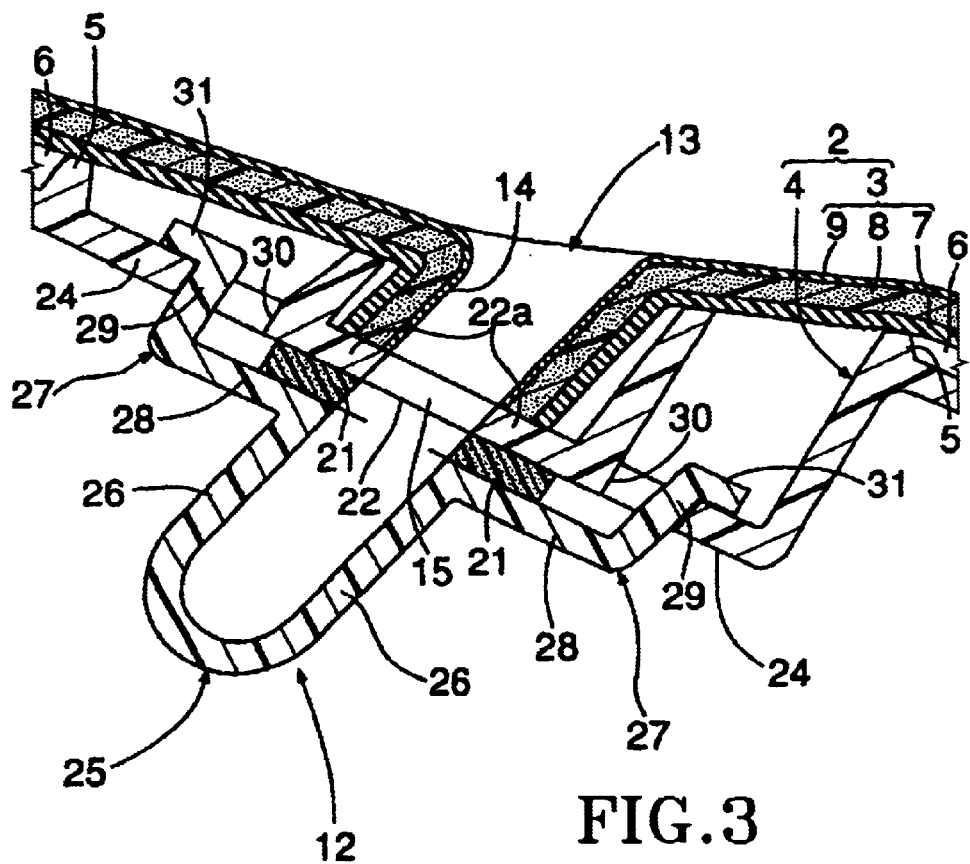
FIG.3
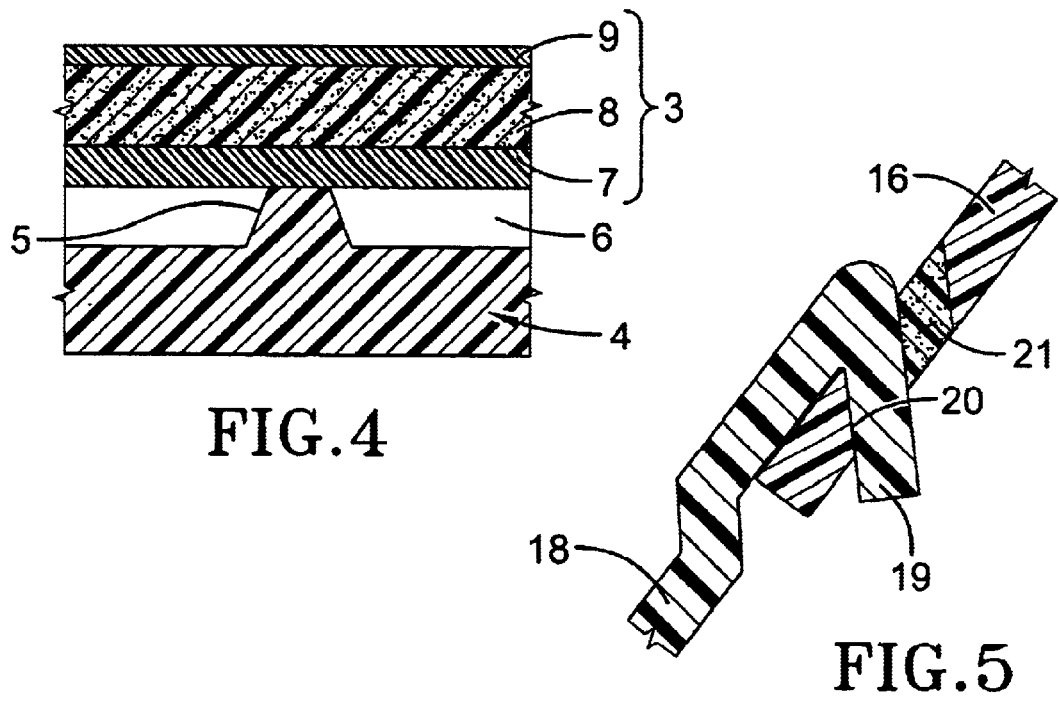
FIG.4
FIG.5

INSTRUMENT PANEL-AIR CONDITIONING DUCT ASSEMBLY FOR VEHICLE

FIELD OF THE INVENTION

The present invention relates to an instrument panel-air conditioning duct assembly for a vehicle.

BACKGROUND ART

There is such a conventional known assembly in which an instrument panel made of a synthetic resin and an air-conditioning duct made of a synthetic resin are vibration-welded to each other. In this case, the instrument panel is comprised of a back-side molded panel member formed by an injection molding, and a skin affixed to a surface of the back-side molded panel member through an adhesive. The air-conditioning duct is formed by a blow molding, so that it has a plurality of branched-off duct portions, and pinched-off portions connected to the duct portions are used as portions to be welded.

However, the conventional instrument panel suffers from the following problems: An operation for applying an adhesive to the back-side molded panel member and a foam-molding operation for affixing the skin are requisite, and time for curing the adhesive is also required, resulting in an increased number of steps for producing the instrument panel and thus the assembly.

In the back-side molded panel member, the following problem also is encountered: If a thickened portion such as a member-mounting protrusion is formed on a back of the back-side molded panel member, a sink mark corresponding to the thickened portion, namely, a recess is formed on a surface of the back-side molded panel member, and the skin is conformed to the recess. For this reason, the uniformity of the surface of the instrument panel is reduced, resulting in a reduction in commercial value of the assembly.

A further problem encountered in the conventional assembly is that the weight of the assembly is increased as a result of the air-conditioning duct including the portions to be welded, which are extra from the viewpoint of its intrinsic function.

DISCLOSURE OF THE INVENTION

It is an object of the present invention to provide an instrument panel-air conditioning duct assembly of the above-described type, wherein the number of producing steps is reduced, and the uniformity of the surface of the instrument panel and moreover, a reduction in weight is achieved.

To achieve the above object, according to the present invention, there is provided an instrument panel-air conditioning duct assembly comprising an instrument panel which includes a surface-side molded panel member made of a synthetic resin and a back-side molded panel member made of a synthetic resin, the back-side molded panel member being vibration-welded to the surface-side molded panel member through a plurality of projections existing on a surface thereof opposed to the surface-side molded panel member with a heat-insulating gap left between both of the molded panel members; an air-conditioning duct being formed using a portion of the back-side molded panel member as a portion of a peripheral wall thereof.

The instrument panel is comprised of the surface-side molded panel member and the back-side molded panel member vibration-welded to each other and, hence, it is possible to reduce the number of steps for producing the instrument panel and in turn the number of steps for producing the assembly.

Even if the back-side molded panel member is provided with a thickened portion which produces a sink mark on the surface of the back-side molded panel member, an influence of the sink mark cannot appear on the surface-side molded panel member, because the back-side molded panel member is spaced apart from the surface-side molded panel member, and thus, the uniformity of the surface of the instrument panel is ensured.

Further, a portion of the peripheral wall of the air-conditioning duct is a portion of the back-side molded panel member, and the air-conditioning duct need only have a pipe-shaped form required to fulfill its intrinsic function. Therefore, it is possible to achieve a reduction in weight of the duct and thus a reduction in weight of the assembly.

When cold air is allowed to flow into the duct during cooling, a portion of the back-side molded panel member and a portion in the vicinity thereof are cooled by the cold air, but the transmission of the cooling to the surface-side molded panel member is inhibited by the heat-insulating gap. Therefore, dew condensation cannot be produced on the surface-side molded panel member.

BRIEF DESCRIPTION OF THE DRAWINGS

FIG. 3 is an enlarged view of a portion of the instrument panel as indicated in FIG. 2;

FIG. 4 is an enlarged view of another portion of the instrument panel as indicated in FIG. 2; and FIG. 5 is an enlarged view of yet another portion of the instrument panel as indicated in FIG. 2.

BEST MODE FOR CARRYING OUT THE INVENTION

Figure 1:
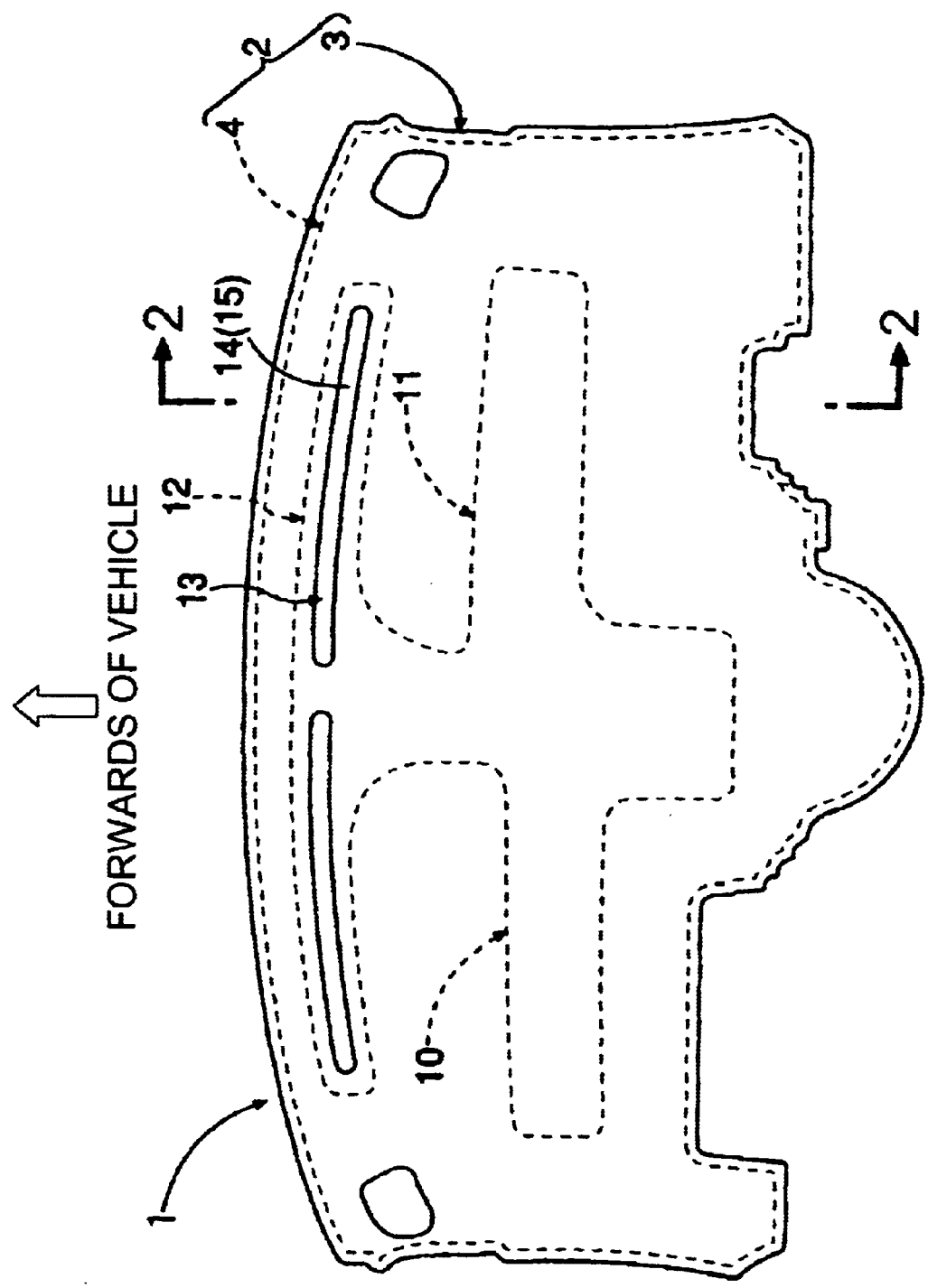
FIG. 1 is a schematic plan view of an instrument panel-air conditioning duct assembly.
Figure 2:
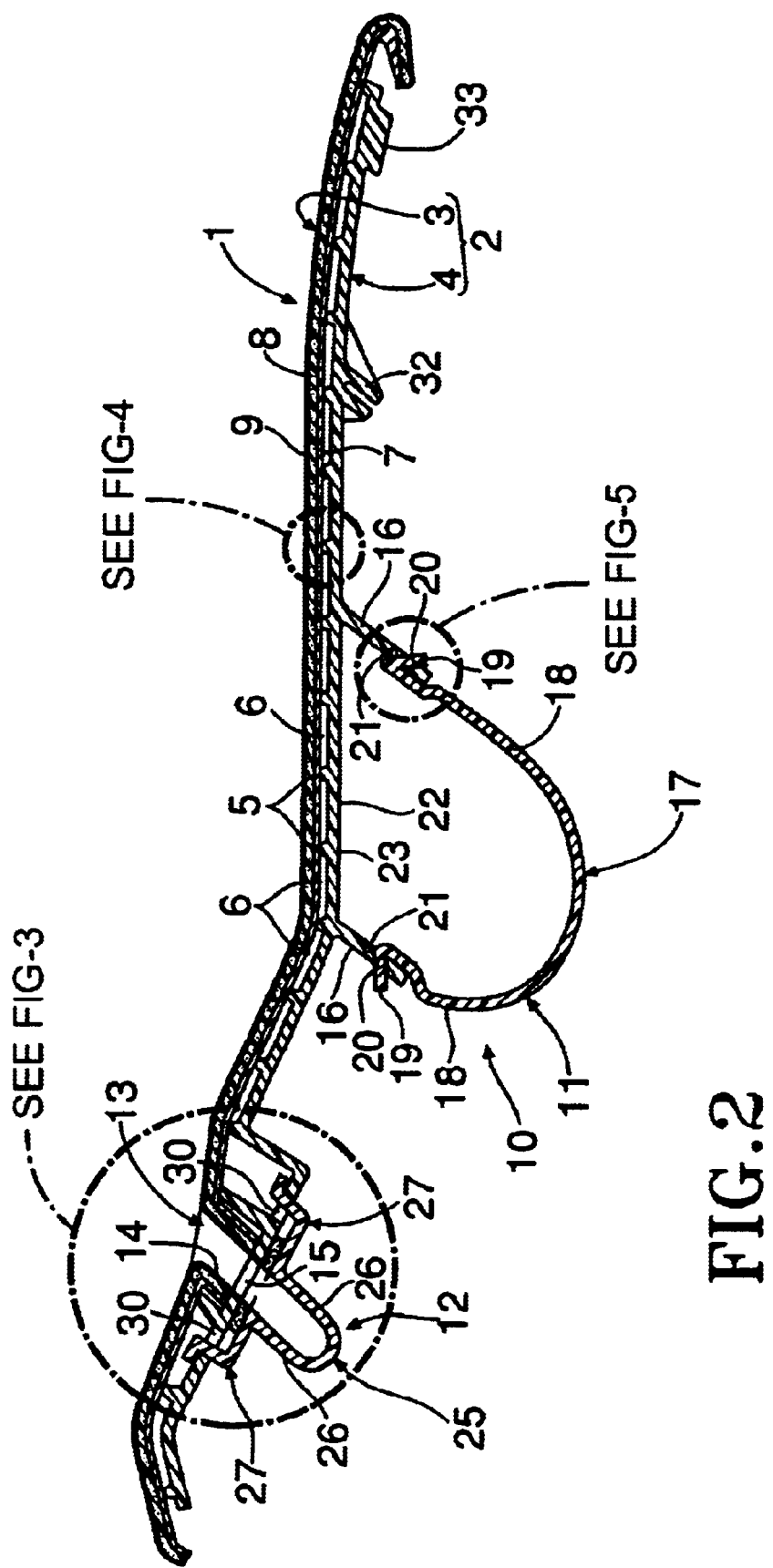
FIG. 2 is an enlarged sectional view taken along a line 2—2 in FIG. 1.

In an instrument panel-air conditioning duct assembly 1 for a vehicle shown in FIGS. 1 and 2, an instrument panel 2 includes a surface-side molded panel member 3 made of a synthetic resin, and a back-side molded panel member 4 made of a synthetic resin extending over the substantially entire back of the panel member 3. The back-side molded panel member 4 is vibration-welded to the surface-side molded panel member 3 through a plurality of projections existing on its side opposed to the surface-side molded panel member 3, namely, on its surface, e.g., projecting stripes 5 extending in a lateral direction of the vehicle in the embodiment, and a heat-insulating gap 6 exists between both of the molded panel members 3 and 4.

The surface-side molded panel member 3 is formed in a vacuum molding manner using a sheet having a single-layer structure or a sheet having two or more layers, e.g., a sheet having a three-layer structure in the embodiment. The surface-side molded panel member 3 is comprised of a base layer 7 made of PP (polypropylene), a cushion layer 8 integral with the base layer 7 and made of a PP foam, and a surface layer 9 integral with the cushion layer 8 and made of TPO (a thermoplastic olefin). The base layer 7 is vibration-welded to the back-side molded panel member 4.

The back-side molded panel member 4 is of a single-layer structure and is formed in an injection molding manner using PP. This panel member 4 is a strength member for the instrument panel 2 and hence, its thickness is set at a value exceeding the thickness of the base layer 7 of the surface-side molded panel member 3. The thickness of the base layer 7 is set at a minimum value which does not impede, for example, the vibration welding interference from the demand for a reduction in weight of the assembly 1.

Because the instrument panel 2 comprises the surface-side molded panel member 3 and the back-side molded panel member 4 vibration-welded to each other, as described above, the number of steps for producing the instrument panel 2 and thus the number of steps for producing the assembly 1 can be reduced.

An air-conditioning duct 10 includes a first duct member 11 and a second duct member 12 which communicates with the first duct member 11. The first duct member 11 extends in the lateral direction of the vehicle at a substantially central portion of the instrument panel 2 in a longitudinal direction of the vehicle. On the other hand, the second duct member 12 extends in the lateral direction of the vehicle along an air blow-off port 13 for a defroster exiting in a front portion of the instrument panel 2 in the longitudinal direction of the vehicle. The air blow-off port 13 comprises bore portions 14 and 15 defined in the surface-side and back-side molded panel members 3 and 4, with edges of the bores 14 and 15 being in close contact with each other.

In order to form the first duct member 11, the back-side molded panel member 4 has, at a substantially central portion of its back in the longitudinal direction of the vehicle, a pair of plate-shaped mounting portions 16 protruding in an opposed relation to each other with a predetermined gap left therebetween. On the other hand, the first duct member 11 has a tub-shaped duct body 17 made of a synthetic resin, whose opposed sidewalls 18 are mounted to the mounting portions 16, respectively. In the embodiment, engagement claws 19 each folded from each of end edges of the sidewalls 18 to form an acute angle with each of an outer surface of each sidewall 18 are engaged into engagement bores 20 in the mounting portions 16 from inside the mounting portions 16. The engagement claws 19 are inserted between the mounting portions 16 in such a manner that the distance between both of the sidewalls 18 is reduced forcibly and hence, the engagement of the engagement claws 19 and the engagement bores 20 is maintained by restoring forces of the sidewalls 18.

Seal members 21 are mounted between upper inner surfaces of the engagement bores 20 and outer surfaces of the engagement claws 19 opposed to the bores 20, respectively, whereby the leakage of cold air and warm air to the outside through the bores 20 is prevented.

In this way, the first duct member 11 is formed using, as a portion of its peripheral wall, a portion 22 of the back-side molded panel member 4, namely, the mounting portions 16 and a portion 23 sandwiched between the mounting portions 16.

As is also shown in FIG. 3, flat portions of the back-side molded panel member 4 existing between on opposite sides of the bore 15 of the air-blow-off port are used as mounting portions 24 to form the second duct member 12. On the other hand, the second duct member 12 has a tub-shaped duct body 25 made of a synthetic resin, whose opposed sidewalls 26 are mounted to the mounting portions 24, respectively. In the embodiment, engagement portions 27 are connected to the end edges of the sidewalls 18, respectively. In each of the engagement portions 27, a flat portion 28 folded outwards at a substantially right angle from each of end edges of the sidewalls 26 is opposed to a back of each of the mounting portions 24. A first engagement portion 29 rising from an outer edge of each of the flat portions 28 is engaged with an outer inner surface of an engagement bore 30 in the mounting portion 24, and a second engagement portion 31 folded to extend outwards from the first engagement portion 29 and substantially in parallel to the flat portion 28 is engaged with an edge of the engagement bore 30 on the side of the surface of each of the mounting portions 24. Both of the second engagement portions 31 are passed through the engagement bores 30 in such a manner that the distance between both of the sidewalls 26 is forcibly reduced. Therefore, the engagement of the first and second engagement portions 29 and 31 and the engagement bores 30 as well as their edges is maintained by restoring forces of thee sidewalls 26.

Seal members 21 are mounted between the backs of the mounting portions 24 and upper surfaces of the flat portions 28 opposed to the backs of the mounting portions 24, respectively, thereby preventing the leakage of cold air and warm air to the outside through gaps between the mounting portions 24 and the flat portions 28.

In this way, the second duct member 12 is formed using, as a portion of its peripheral wall, a portion 22 of the back-side molded panel member 4, namely, a portion having the bore portion 15 of the air blow-off port. Each of the tub-shaped duct bodies 17 and 25 is formed in an injection molding process using PP, for example.

As described above, a portion of the peripheral wall of the air-conditioning duct 10 is the portion 22 of the back-side molded panel member 4, and the duct 10 need only have a pipe-shaped form required to fulfill its intrinsic function. Therefore, it is possible to achieve a reduction in weight of the duct 10 and thus a reduction in weight of the assembly 1.

When cold air is allowed to flow into the air-conditioning duct 10 during cooling, the portion 22 of the back-side molded panel member 4 and a portion in the vicinity thereof are cooled by the cold air, but the transmission of the cooling to the surface-side molded panel member 3 is inhibited by the heat-insulating gap 6. Therefore, dew condensation cannot be produced on the surface-side molded panel member 3.

The back-side molded panel member 4 can also function as a support member for various members, and for example, a wire harness mounting portion 32, a meter inner panel mounting portion 33 and the like are projectingly provided on the back of the panel member 4. Even if the back-side molded panel member 4 is provided with the thickened portions which produce a sink mark on the surface thereof, an influence of the sink mark cannot appear on the surface-side molded panel member 3, because the back-side molded panel member 4 is spaced apart from the surface-side molded panel member 3, whereby the uniformity of the surface of the instrument panel 2 is ensured.

In the assembly 1, the surface-side and back-side molded panel members 3 and 4 as well as the tub-shaped duct bodies 17 and 25 can be formed using the same material, and the coupling of the panel members 3 and 4 to each other and the assembling of the duct bodies 17 and 25 to the back-side molded panel member 4 can be-achieved without use of a fastening plate such as a machine screw. The recyclability of the assembly 1 of this type can be enhanced.

On the other hand, the tub-shaped duct bodies 17 and 25 are not vibration-welded to the back-side molded panel member 4 and hence, the synthetic resin forming the duct bodies 17 and 25 need not be the same as that forming the back-side molded panel member 4. Therefore, the cost of production of the assembly 1 can be reduced by using a synthetic resin different from and less expensive than that forming the back-side molded panel member 4, or by using a regenerated synthetic resin as the synthetic resin for the duct bodies 17 and 25. Even in this case, the separability of the duct bodies 17 and 25 from the back-side molded panel member 4 can be improved and hence, the recyclability of the duct bodies 17 and 25 cannot be detracted.

What is claimed is:

1. An instrument panel-air conditioning duct assembly for a vehicle comprising:
    an instrument panel which includes a surface-side molded panel member made of a synthetic resin and a back-side molded panel member made of a synthetic resin, said back-side molded panel member being vibration-welded to said surface-side molded panel member through a plurality of projections existing on a surface thereof opposed to said surface-side molded panel member with an insulating gap left between said molded panel members; and
    an air-conditioning duct supported by said back-side molded panel member, said air-conditioning duct formed by attaching a duct member to said back-side molded panel member such that a portion of said back-side molded panel member forms a wall of said duct.

2. An instrument panel-air conditioning duct assembly for a vehicle according to claim 1, wherein said air-conditioning duct has a tub-shaped duct body whose opposed sidewalls are mounted to said back-side molded panel member.

3. An instrument panel-air conditioning duct assembly for a vehicle according to claim 2, wherein said tub-shaped duct body is formed of a synthetic resin selected from the group consisting of a synthetic resin different from the synthetic resin forming the back-side molded panel member and a regenerated synthetic resin.

4. An instrument panel-air conditioning duct assembly for a vehicle according to claim 2, further comprising hook-shaped elements on said opposed side walls of said tub-shaped duct body for engaging corresponding apertures in said back-side molded panel member.

5. An instrument panel-air conditioning duct assembly for a vehicle according to claim 4, wherein said tub-shaped duct body is sufficiently flexible to allow said opposed side walls thereof to be bent inward, each toward the other.

6. An instrument panel-air conditioning duct assembly for a vehicle according to claim 4, further comprising seal members for filling free space in said apertures existing after insertion of said hook-shaped elements, said seal members preventing leakage of air from said air-conditioning duct.

7. An instrument panel-air conditioning duct assembly for a vehicle according to claim 1, wherein mounting portions protrude from a rear surface of said back-side molded panel member and said duct member is attached to said mounting portions.

8. An instrument panel-air conditioning duct assembly for a vehicle according to claim 4, wherein mounting portions protrude from a rear surface of said back-side molded panel member and said apertures are provided in said mounting portions.

9. An instrument panel-air conditioning duct assembly for a vehicle comprising:
    an instrument panel including a surface-side molded panel member having an outer surface visible to occupants of said vehicle, and a back-side molded panel member, each panel member made of a synthetic resin, said back-side molded panel member having mounting means located on a back surface for attaching said instrument panel to said vehicle and being vibration-welded to said surface-side molded panel member via a plurality of projections extending from a front surface thereof that is opposed to said surface-side molded panel member;
    an insulating gap residing between said molded panel members after said panel members have been vibration-welded; and
    an air-conditioning duct formed by connecting a duct body to a mating portion of said back-side molded panel member, such that a portion of said back-side molded panel member forms a wall of said duct;
    wherein constructing said instrument panel in such a manner prevents defects commonly visible on said front surface of said back-side molded panel member as a result of molding said mounting means from being transferred to said outer surface of said surface-side molded panel member; and
    wherein said insulating gap substantially prevents the temperature of air flowing through said air conditioning duct from affecting the temperature of said surface-side molded panel member.

10. An instrument panel-air conditioning duct assembly for a vehicle according to claim 9, wherein said duct body is tub-shaped and has opposed sidewalls that are mounted to said back-side molded panel member.

11. An instrument panel-air conditioning duct assembly for a vehicle according to claim 10, wherein said tub-shaped duct body is formed of a synthetic resin selected from the group consisting of a synthetic resin different from the synthetic resin forming the back-side molded panel member, and a regenerated synthetic resin.

12. An instrument panel-air conditioning duct assembly for a vehicle according to claim 10, further comprising hook-shaped elements on said opposed side walls of said tub-shaped duct body for engaging corresponding apertures in said back-side molded panel member.

13. An instrument panel-air conditioning duct assembly for a vehicle according to claim 12, wherein said tub-shaped duct body is sufficiently flexible to allow said opposed side walls thereof to be bent inward, each toward the other.

14. An instrument panel-air conditioning duct assembly for a vehicle according to claim 12, further comprising seal members for filling free space in said apertures existing after insertion of said hook-shaped elements, said seal members preventing leakage of air from said air-conditioning duct.

15. An instrument panel-air conditioning duct assembly for a vehicle comprising:
    an instrument panel, said instrument panel further comprising:
        a surface-side molded panel member made of a synthetic resin;
        a back-side molded panel member made of a synthetic resin,
    said back-side molded panel member having a mounting portion extending outward from a back surface thereof for receiving a portion of a duct body and being vibration-welded to said surface-side molded panel member via a plurality of projections extending from a front surface thereof that is opposed to said surface-side molded panel member, and
    a gap residing between said molded panel members after said panel members have been vibration-welded; and
    an air-conditioning duct supported by said back-side molded panel member, said air-conditioning duct formed by removably attaching a tub-shaped flexible duct body to said mounting portion on said back-side molded panel member such that a portion of said back-side molded panel member forms a wall of said duct;

wherein said flexible duct body is retained on said back-side molded panel member by the engagement of hook-shaped elements extending from opposed side walls of said tub-shaped flexible duct body with corresponding apertures in said mounting portion of said back-side molded panel member.

16. An instrument panel-air conditioning duct assembly for a vehicle according to claim 15, wherein said flexible duct body is formed of a synthetic resin selected from the group consisting of a synthetic resin different from the synthetic resin forming the back-side molded panel member, and a regenerated synthetic resin.

17. An instrument panel-air conditioning duct assembly for a vehicle according to claim 15, further comprising seal members for filling free space in said apertures existing after insertion of said hook-shaped elements, said seal members preventing leakage of air from said air-conditioning duct.

18. An instrument panel-air conditioning duct assembly for a vehicle according to claim 15, wherein said tub-shaped flexible duct body is further retained on said back-side molded panel member by restorative forces in said opposed side walls of said flexible duct body pushing against said mounting portion of said back-side molded panel member.

19. An instrument panel-air conditioning duct assembly for a vehicle according to claim 15, wherein constructing said instrument panel in such a manner prevents defects commonly visible on said front surface of said back-side molded panel member as a result of molding mounting means therein from being transferred to said surface-side molded panel member.

20. An instrument panel-air conditioning duct assembly for a vehicle according to claim 15, wherein said gap substantially prevents the temperature of air flowing through said air conditioning duct from affecting the temperature of said surface-side molded panel member.

* * * * *